United States Patent [19]
Ban et al.

[11] 3,776,312
[45] Dec. 4, 1973

[54] WELL BOTTOM TREATMENT

[75] Inventors: Akos Ban; Sandor Nagy, both of Budapest; Valer Balint, Nagykanizsa, all of Hungary

[73] Assignee: Koolaj-es Gazipari Tervezo Vallalat, Budapest, Hungary

[22] Filed: Oct. 28, 1971

[21] Appl. No.: 193,593

[30] Foreign Application Priority Data
Oct. 6, 1970  Hungary ............................ KO 2368

[52] U.S. Cl. .................................. 166/302, 166/308
[51] Int. Cl. ...................... E21b 43/24, E21b 43/26
[58] Field of Search ............. 166/302, 303, 273–275, 166/305 R, 307, 308, 300

[56] References Cited
UNITED STATES PATENTS

| | | | |
|---|---|---|---|
| 3,138,204 | 6/1964 | Richardson | 166/305 R |
| 2,813,583 | 11/1957 | Marx et al. | 166/271 |
| 2,776,714 | 1/1957 | Stanclift, Jr. et al. | 166/305 R |
| 3,101,781 | 8/1963 | Connally, Jr. | 166/273 |
| 3,123,136 | 3/1964 | Sharp | 166/273 |
| 3,303,878 | 2/1967 | Connally, Jr. | 166/273 |
| 3,333,632 | 8/1967 | Kyte | 166/272 |
| 3,384,177 | 5/1968 | Day et al. | 166/307 |
| 3,392,782 | 7/1968 | Ferrell et al. | 166/275 |
| 3,464,492 | 9/1969 | Friedman | 166/274 X |

*Primary Examiner*—Stephen J. Novosad
*Attorney*—Gabriel P. Katona

[57] ABSTRACT

Microcracks are formed in the environs of deep drilled wells, such as oil wells, by heating and then cooling the adjacent strata. This can be accomplished by introducing ammonia into the stratum water at the bottom of the well. The resulting heat of dissolution will slightly heat the strata adjacent to the bottom of the well as the ammonia will chemically assist the displacement of recoverable materials lodged in these strata. The cooling to the initial temperature of the bottom can be accomplished by the presence of additional stratum water in the well.

3 Claims, No Drawings

WELL BOTTOM TREATMENT

In the environment of deep drilled wells, particularly of hydrocarbon wells of various designations (prospecting, production, observation or medium injection) in addition to the finer fractions of the rock quite often resinous-bituminous and other materials are deposited which choke the pores in the stratum thereby impeding the seepage properties of the layer. As a result of these depositions the production, i.e. absorption capacity of the wells deteriorates.

When water and other media (e.g. gas) are injected into the hydrocarbon containing strata, seepage is reduced and thereby the absorption capacity of the strata deteriorates also because of the surface properties at boundaries between the different phases.

In order to improve the productivity, i.e. absorption capacity of wells various methods have been applied to the treatment of the well bottom environment (layer blasting, acidification, treatment with organic solvents, treatment with surfactants, etc.)

Of the hitherto known methods for stratum treatment the best results were obtained with layer blasting. Blasting of the stratum has, however, the drawback of forming substantially larger than intended, so-called macrocracks in the environment of the well bottom, said cracks being capable of penetrating into some undesirable parts of the stratum, moreover in some given case even into other strata. These cracks make it possible for the stratum water and for the free gases to flow in an undesirable manner into the environment of the well bottom due to the fact that the cracks may extend into more distant regions in certain directions, while in certain directions the permeability of the rock in the environment of the well bottom is not improved.

Because of this phenomenon stratum blasting in the environment of the well is rather problematical. In order to eliminate these drawbacks stratum blasting is often combined with the thermal or chemical treatment of the well bottom environment.

The present invention intends to help in the elimination of these drawbacks.

The present invention relates to a method which jointly contains the advantages of the hitherto known methods and, at the same time, eliminates the known drawbacks of stratum blasting. In the course of our experiments we found that if the rock in the environment of the well bottom is slightly heated and then cooled under the action of the temperature of the stratum water to its initial temperature, a multitude of microcracks will be formed in the stratum in all directions. At the same time, as the result of such minor effects, no larger cracks (macro-cracks) are formed which could enable the penetration of substances saturated in the stratum to some distant point, or of substances saturated in other strata into the environment of the well bottom.

As disclosed in our copending application, Ser. No. 193,429, filed simultaneously herewith, we found in our further experiments that ammonia and its aqueous solution, due to their favourable adsorption properties towards the material of the rock matrix, are suitable for the displacement of the membrane of hydrocarbons saturated in the rock and bound polarly to the wall of the rocks as well as for the displacement of resinous and bituminous materials from the gaps in the rock, by being adsorbed in place of said materials whereby entirely identical results to those achieved by the chemical treatment of well bottoms are obtained.

Ammonia is readily soluble in water even at high pressure (80 to 150 kg/cm$^2$) and at its critical temperature (132.4°C). During its dissolution considerable heat is liberated, the specific gravity of the solutions is lower than the initial specific gravity of water (specific volume increases) and by applying different dissolution ratios, any solution with some arbitrarily chosen specific gravity adapted to the specific gravity of the substances saturated in the stratum can be prepared.

In carrying out the method in accordance with the invention, provided no water is to be found in the stratum in the immediate vicinity of the well bottom, first of all water is injected into the environment of the well bottom. If there is some stratum water present in the environment of the well bottom this stratum water is being used by introducing ammonia thereinto.

As a result ammonia will dissolve in situ in the water in the immediate vicinity of the well bottom, and the liberated considerable amount of heat of dissolution will exert the above described thermal effect and at the same time the ammonia or its said solution will subject the stratum to chemical treatment.

With the help of the injected ammonia the specific gravity of the stratum water, or of the previously injected water into the environment of the well bottom, can be brought to agree with the specific gravity of hydrocarbons saturated in the stratum.

By means of the application of said method a layer of considerably more extensive and more uniform permeability and with this a greater increase in productivity can be achieved when applied with or without stratum blasting to petroleum and gas production, as well as to water and other media injecting wells, than with any of the hitherto known methods of treatment.

What we claim is:

1. In a process for increasing the permeability of strata in the vicinity of well bottoms without creating a substantial amount of macrocracks therein, wherein naturally occurring or externally introduced water is present in said vicinity, the improvement which comprises generating heat *in situ* in said vicinity by injecting ammonia into the water present in said vicinity, whereby the heat of dissolution of the ammonia results in the formation of microcracks.

2. The improvement in the process of claim 1, wherein gaseous ammonia is injected into the water in the vicinity of the well bottom.

3. The improvement in the process of claim 2, wherein the amount of the injected ammonia is such that the resulting aqueous solution thereof will have a specific gravity approximating that of the hydrocarbons in said strata under the given temperature and pressure conditions.

* * * * *